(12) United States Patent
Patil et al.

(10) Patent No.: US 10,899,887 B2
(45) Date of Patent: Jan. 26, 2021

(54) HIGH HEAT COPOLYIMIDES, ARTICLES PREPARED THEREFROM, AND METHODS OF MANUFACTURING COPOLYIMIDE ARTICLES

(71) Applicant: SABIC GLOBAL TECHNOLOGIES B.V., Bergen op Zoom (NL)

(72) Inventors: Dadasaheb V. Patil, Evansville, IN (US); Viswanathan Kalyanaraman, Newburgh, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/302,268

(22) PCT Filed: May 9, 2017

(86) PCT No.: PCT/US2017/031716
§ 371 (c)(1),
(2) Date: Nov. 16, 2018

(87) PCT Pub. No.: WO2017/200799
PCT Pub. Date: Nov. 23, 2017

(65) Prior Publication Data
US 2019/0292319 A1   Sep. 26, 2019

Related U.S. Application Data

(60) Provisional application No. 62/339,252, filed on May 20, 2016.

(51) Int. Cl.
| | | |
|---|---|---|
| C08G 73/10 | (2006.01) |
| C08J 5/18 | (2006.01) |
| C08L 79/08 | (2006.01) |
| B29C 48/00 | (2019.01) |
| B29C 41/00 | (2006.01) |
| B29K 79/00 | (2006.01) |
| B29K 105/00 | (2006.01) |

(52) U.S. Cl.
CPC ..... *C08G 73/1071* (2013.01); *C08G 73/1042* (2013.01); *C08G 73/1046* (2013.01); *C08G 73/1053* (2013.01); *C08G 73/1064* (2013.01); *C08G 73/1067* (2013.01); *C08J 5/18* (2013.01); *C08L 79/08* (2013.01); *B29C 41/003* (2013.01); *B29C 48/022* (2019.02); *B29K 2079/08* (2013.01); *B29K 2105/0085* (2013.01); *C08J 2379/08* (2013.01); *C08L 2201/08* (2013.01); *C08L 2203/16* (2013.01)

(58) Field of Classification Search
None
See application file for complete search history.

(56) References Cited

U.S. PATENT DOCUMENTS

| | | | | |
|---|---|---|---|---|
| 4,504,650 A | * | 3/1985 | Cooper | C08G 73/1014 528/125 |
| 2005/0070684 A1 | * | 3/2005 | Gallucci | C08G 73/1064 528/170 |
| 2007/0272124 A1 | * | 11/2007 | Tsutsumi | C08J 5/18 106/287.24 |
| 2013/0256943 A1 | * | 10/2013 | Matsutani | B32B 27/281 264/173.16 |

FOREIGN PATENT DOCUMENTS

EP   0179471 A2   4/1986

OTHER PUBLICATIONS

International Search Report for International Application No. PCT/US2017/031716; International Filing Date: May 9, 2017; dated Aug. 3, 2017; 5 pages.
Written Opinion of the Iternational Searching Authority; International Application No. PCT/US2017/031716; International Filing Date: May 9, 2017; dated Aug. 3, 2017; 7 pages.

* cited by examiner

*Primary Examiner* — Robert T Butcher
(74) *Attorney, Agent, or Firm* — Cantor Colburn LLP

(57) ABSTRACT

A copolyimide includes the reaction product of an aromatic dianhydride component including a substituted or unsubstituted pyromellitic dianhydride or a functional derivative thereof and an aromatic bis(ether phthalic anhydride) or a functional derivative thereof, and an organic diamine component comprising a substituted or unsubstituted phenylene diamine and a diaminodiphenyl sulfone. Articles and compositions including the copolyimides and methods of manufacturing a polyimide film are also described.

18 Claims, 2 Drawing Sheets

HIGH HEAT COPOLYIMIDES, ARTICLES PREPARED THEREFROM, AND METHODS OF MANUFACTURING COPOLYIMIDE ARTICLES

CROSS-REFERENCE TO RELATED APPLICATIONS

This application is a National Stage application of PCT/US2017/031716, filed May 9, 2017, which claims the benefit of U.S. Provisional Application No. 62/339,252 filed May 20, 2016, both of which are incorporated by reference herein in their entirety.

BACKGROUND

Polymer-containing optical materials can find use as eyeglass lenses, as well as microlenses (e.g., for optical information communication), coating materials for an optical device, or core materials for an optical fiber. Manufacturing such products typically requires exposure to high temperatures; therefore a polymer having a high heat resistance is necessary in order to withstand the processing steps.

Polyetherimides have high heat distortion temperatures and high glass transition temperatures that make their use as coatings, molded articles, composites, and the like very attractive where high temperature resistance is desired. As such, these polymers have found wide use in shaped articles, sheet materials, and coatings for use in challenging physical environments such as aerospace applications, lighting applications, and automotive applications. Due to their high glass transition temperature and high melt viscosity, however, polyetherimides can be difficult to process into finished products.

Thermoplastic polyimides comprising sulfone linkages are also known to withstand high temperatures while maintaining high transparency. The use of polyetherimide sulfones has been limited, however, due to poor melt processability, as well as the high cost stemming from the expensive monomers required for their synthesis. Additionally, sulfone-containing polymers have also been found to suffer from increased water uptake, poor thermal and dimensional stability, and $SO_2$ outgassing.

Accordingly, there remains a continuing need in the art for a high heat polymer, in particular a high heat polyetherimide, having good thermal properties in combination with good optical properties (e.g., high heat polymers that are optically transparent) to overcome the above-described technical limitations.

BRIEF DESCRIPTION

A copolyimide comprises the reaction product of an aromatic dianhydride component comprising, based on the total moles of the aromatic dianhydride component, 10 to 90 mole percent of a substituted or unsubstituted pyromellitic dianhydride or a functional derivative thereof; and 10 to 90 mole percent of an aromatic bis(ether phthalic anhydride) or a functional derivative thereof, of the formula

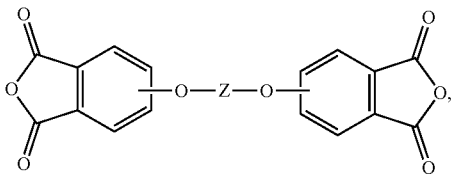

wherein Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, and the divalent bonds of the —O—Z—O— group are in the 3,3', 3,4', 4,3', or the 4,4' positions, preferably in the 4,4' position; and an organic diamine component comprising, based on the total moles of the organic diamine component, 10 to 90 mole percent of a substituted or unsubstituted phenylene diamine; and 10 to 90 mole percent of a diaminodiphenyl sulfone; and wherein the copolyimide exhibits at least one, preferably at least two, more preferably each of the following properties: a glass transition temperature greater than or equal to 210° C., preferably 213 to 365° C., or 220 to 290° C., or 255 to 280° C. as determined by differential scanning calorimetry; an onset decomposition temperature of greater than or equal to 500° C., as determined by thermogravimetric analysis under nitrogen or air; has a water uptake of less than or equal to 3.2%, preferably less than 2.85%, more preferably less than 1.1%, determined by comparing the difference in the weight of a polyimide film that has been immersed in water for 24 hours with the dry weight of the same polyimide film prior to immersion in water; a coefficient of thermal expansion of 20 to 55 ppm/° C., or 30 to 55 ppm/° C., or 40 to 55 ppm/° C., as determined according to ASTM E 831; and a transmission of at least 85%, preferably at least 90% at one or more of 850 nm, 1310 nm, or 1550 nm as measured on an ultraviolet-visible/near infrared spectrophotometer using a 20 to 100 micrometer-thick film of the copolyimide.

A method of manufacturing a polyimide film comprises casting a solution comprising a copolyamic acid corresponding to the copolyimide and a liquid carrier on a substrate to provide a copolyamic acid film; and curing the polyamic acid film to provide the polyimide film.

A method of manufacturing a polyimide film comprises extruding a solution comprising a copolyamic acid solution corresponding to the copolyimide and a liquid carrier to provide a polyimide film.

A polymer composition comprises 1 to 99 weight percent, preferably 10 to 90 weight percent, of a thermoplastic polymer, preferably a polyarylene ether ketone, a polybenzimidazole, a polyarylene sulfone, a polyarylene sulfide, a polyarylene ether, a polyimide, a polyamide imide, a polyetherimide, a liquid crystalline polymer, or a combination comprising at least one of the foregoing; and 1 to 99 weight percent, preferably 10 to 90 weight percent, of the above copolyimide, wherein weight percent of each component is based on the total weight of the composition.

An article comprising the above copolyimide, or a copolyimide made by the above method, or the above composition is also disclosed.

The above described and other features are exemplified by the following figures and detailed description.

BRIEF DESCRIPTION OF THE DRAWINGS

The following Figures are exemplary embodiments.

DETAILED DESCRIPTION

Figure 1:
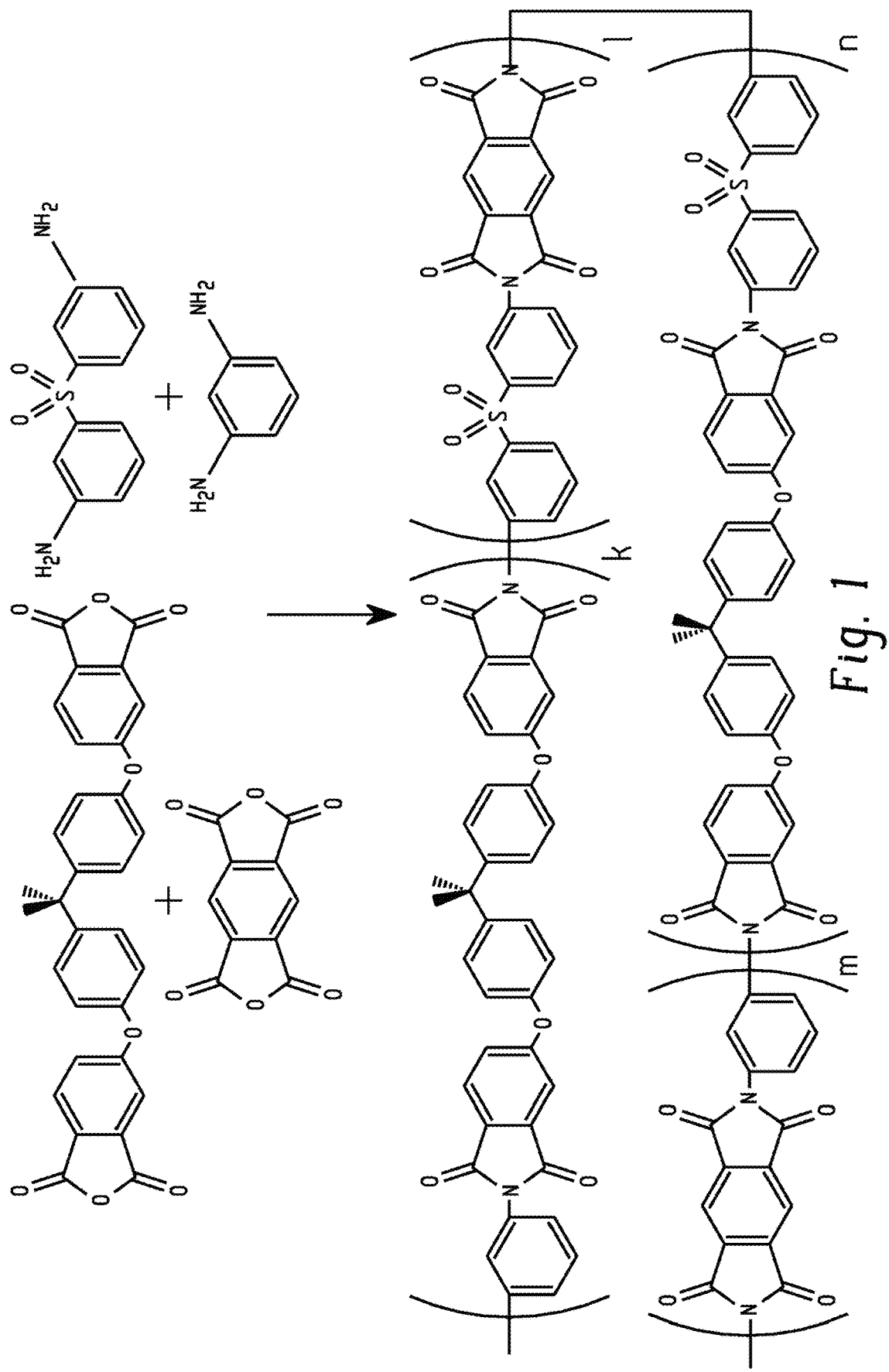
FIG. 1 is a chemical scheme showing a synthetic route to a copolyimide.

Disclosed herein are copolyimides having a desirable combination of properties, making them well-suited for use in optical applications. The present inventors have unexpectedly found that a copolyimide prepared from reaction of specific amounts of an aromatic dianhydride component comprising a pyromellitic dianhydride and an aromatic bis(ether phthalic anhydride) and an organic diamine component comprising a phenylene diamine and a diaminodiphenyl sulfone advantageously exhibits high heat performance, low water uptake, a low coefficient of thermal expansion, good mechanical properties, and excellent transparency.

Accordingly, one aspect of the present disclosure is a copolyimide. The copolyimide comprises the reaction product of an aromatic dianhydride component and an organic diamine component.

The aromatic dianhydride component comprises a substituted or unsubstituted pyromellitic dianhydride or a functional derivative thereof including, for example, pyromellitic acid, a $C_{1-6}$ alkyl ester of pyromellitic acid (e.g., pyromellitic acid tetramethyl ester), pyromellitic acid halide (e.g., pyromellitic acid chloride), or a combination comprising at least one of the foregoing. In some embodiments, the aromatic dianhydride component comprises pyromellitic dianhydride.

The pyromellitic dianhydride or functional derivative thereof can be present in an amount of 10 to 90 mole percent, based on the total moles of the aromatic dianhydride component. Within this range, the pyromellitic dianhydride or functional derivative thereof can be present in an amount of 10 to 85 mole percent, of 25 to 75 mole percent, or 50 to 70 mole percent, or greater than 50 to 70 mole percent. In some embodiments, the pyromellitic dianhydride or functional derivative thereof can be present in an amount of 10 to 50 mole percent, or 12 to 50 mole percent, or 12 to 45 mole percent, or 12 to 38 mole percent, based on the total moles of the aromatic dianhydride component. In some embodiments, the pyromellitic dianhydride or functional derivative thereof can be present in an amount of greater than 50 to 90 mole percent, or 60 to 90 mole percent, or 62 to 88 mole percent, or 65 to 88 mole percent, based on the total moles of the aromatic dianhydride component.

In addition to the pyromellitic dianhydride or a functional derivative thereof, the aromatic dianhydride component comprises an aromatic bis(ether phthalic anhydride) or a functional derivative thereof. The aromatic bis(ether phthalic anhydride) is of the formula (I)

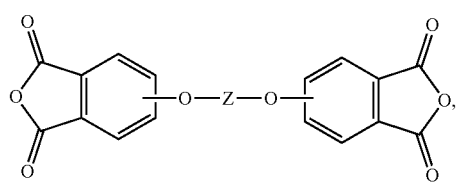

wherein Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing. The divalent bonds of the —O—Z—O— group are in the 3,3', 3,4', 4,3', or the 4,4' positions, preferably in the 3,3' position or the 4,4' position, more preferably in the 4,4' position. Exemplary groups Z include groups of the formula (II)

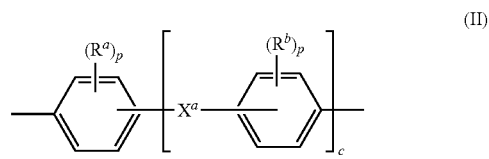

wherein $R^a$ and $R^b$ are each independently the same or different, and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, —P(=O)(R)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of the formula (IIA)

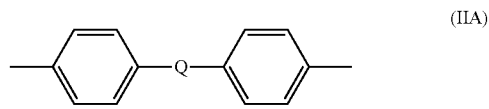

wherein Q is —O—, —S—, —C(O)—, —SO$_2$—, —SO—, —P(R$^a$)(=O)— wherein $R^a$ is a $C_{1-8}$ alkyl or $C_{6-12}$ aryl, or —C$_y$H$_{2y}$— wherein y is an integer from 1 to 5 or a halogenated derivative thereof (including a perfluoroalkylene group). In a specific embodiment Z is a derived from bisphenol A, such that Q in the above formula is 2,2-isopropylidene. In some embodiments, the aromatic dianhydride component comprises, consists essentially of, or consists of pyromellitic dianhydride and bisphenol A dianhydride, preferably 3,3'-bisphenol A dianhydride, 4,4'-bisphenol A dianhydride, or a combination comprising at least one of the foregoing.

The aromatic bis(ether phthalic anhydride) can be present in an amount of 10 to 90 mole percent, based on the total moles of the aromatic dianhydride component. Within this range, the aromatic bis(ether phthalic anhydride) can be present in an amount of 15 to 90 mole percent, or 25 to 75 mole percent, or 30 to 50 mole percent. In some embodiments the aromatic bis(ether phthalic anhydride) can be present in an amount of 10 to less than 50 mole percent, or 10 to 40 mole percent, or 12 to 38 mole percent, or 12 to 35 mole percent, based on the total moles of the aromatic dianhydride component. Also within this range, in some embodiments the aromatic bis(ether phthalic anhydride) can be present in an amount of 50 to 90 weight percent, or 50 to 88 mole percent, or 55 to 88 mole percent, or 62 to 88 mole percent, based on the total moles of the aromatic dianhydride component.

A functional derivative of the above described aromatic dianhydrides can include, for example, the corresponding tetra acid, the corresponding tetra acid chloride, the corresponding tetra($C_{1-6}$ alkyl ester), or a combination comprising at least one of the foregoing.

The copolyimides of the present disclosure are prepared by the reaction of the above described aromatic dianhydride component with an organic diamine component. The organic diamine component comprises a phenylene diamine and a diaminodiphenyl sulfone. The phenylene diamine can be substituted or unsubstituted, preferably unsubstituted. Exemplary phenylene diamines can include m-phenylenediamine, p-phenylenediamine, 2,4-diaminotoluene, 2,6-diaminotoluene, m-xylylenediamine, p-xylylenediamine, 5-methyl-4,6-diethyl-1,3-phenylene-diamine, benzidine, 3,3'-dimethylbenzidine, 3,3'-dimethoxybenzidine, or a combination comprising at least one of the foregoing phenylene diamines. In some embodiments, the phenylene diamine is m-phenylenediamine, p-phenylenediamine, or a combination comprising at least one of the foregoing, preferably m-phenylene diamine The phenylene diamine can be present in an amount of 10 to 90 mole percent, based on the total moles of the organic diamine component. Within this range, the phenylene diamine can be present in an amount of 10 to 50 mole percent, or 10 to 40 mole percent, or 15 to 40 mole percent, or 18 to 38 mole percent, based on the total moles of the organic diamine component. Also within this range, the phenylene diamine can be present in an amount of 50 to 90 mole percent, or 50 to 88 mole percent, or 50 to 80 mole percent, based on the total moles of the organic diamine component.

In addition to the phenylene diamine, the organic diamine component also includes a diaminodiphenyl sulfone. Examples of suitable diaminodiphenyl sulfones include 3,3'-diaminodiphenyl sulfone, 3,4'-diaminodiphenyl sulfone 4,4'-diaminodiphenyl sulfone, or a combination comprising at least one of the foregoing. In some embodiments, the diaminodiphenyl sulfone is 3,3'-diaminodiphenyl sulfone. In some embodiments, the diaminodiphenyl sulfone is 4,4'-diaminodiphenyl sulfone. In some embodiments, the organic diamine component comprises meta-phenylene diamine and 3,3'-diaminodiphenyl sulfone, 4,4'-diaminodiphenyl sulfone, or a combination comprising at least one of the foregoing. In some embodiments, the organic diamine component comprises, consists essentially of, or consists of meta-phenylene diamine and 3,3'-diaminodiphenyl sulfone.

The diaminodiphenyl sulfone can be present in an amount of 10 to 90 mole percent, based on the total moles of the organic diamine component. Within this range, the diaminodiphenyl sulfone can be present in an amount of 50 to 90 mole percent, or 60 to 90 mole percent, or 60 to 85 mole percent, or 62 to 82 mole percent, based on the total moles of the organic diamine component. Also within this range, the diaminodiphenyl sulfone can be present in an amount of 10 to 50 mole percent, or 12 to 50 mole percent, or 20 to 50 mole percent, based on the total moles of the organic diamine component.

In an embodiment, the copolyimide is the reaction product of an aromatic dianhydride component comprising, based on the total moles of the aromatic anhydride component, 10 to 85 mole percent pyromellitic dianhydride and 15 to 90 mole percent of the aromatic bis(ether phthalic anhydride), and an organic diamine component comprising, based on the total moles of the organic diamine component, 10 to 90 mole percent diaminodiphenyl sulfone, and 10 to 90 mole percent of meta-phenylene diamine. The aromatic bis(ether phthalic anhydride) is preferably 3,3'-bisphenol A dianhydride, 4,4'-bisphenol A dianhydride, or a combination comprising at least one of the foregoing. The diaminodiphenyl sulfone is preferably 3,3'-diaminodiphenyl sulfone, 4,4'-diaminodiphenyl sulfone, or a combination comprising at least one of the foregoing, more preferably 3,3'-diaminodiphenyl sulfone. The copolyimide has a glass transition temperature of greater than or equal to 220° C., preferably 220 to 305° C.

In an embodiment, the copolyimide is the reaction product of an aromatic dianhydride component comprising, based on the total moles of the aromatic anhydride component, 25 to 75 mole percent pyromellitic dianhydride and 25 to 75 mole percent of the aromatic bis(ether phthalic anhydride), and an organic diamine component comprising, based on the total moles of the organic diamine component, 10 to 90 mole percent diaminodiphenyl sulfone, and 10 to 90 mole percent of meta-phenylene diamine. The aromatic bis(ether phthalic anhydride) is preferably 3,3'-bisphenol A dianhydride, 4,4'-bisphenol A dianhydride, or a combination comprising at least one of the foregoing. The diaminodiphenyl sulfone is preferably 3,3'-diaminodiphenyl sulfone, 4,4'-diaminodiphenyl sulfone, or a combination comprising at least one of the foregoing, more preferably 3,3'-diaminodiphenyl sulfone. The copolyimide has a glass transition temperature of greater than or equal to 233° C., preferably 233 to 290° C.

In an embodiment, the copolyimide is the reaction product of an aromatic dianhydride component comprising, based on the total moles of the aromatic anhydride component, 50 to 70 mole percent pyromellitic dianhydride and 30 to 50 mole percent of the aromatic bis(ether phthalic anhydride), and an organic diamine component comprising, based on the total moles of the organic diamine component, 10 to 90 mole percent diaminodiphenyl sulfone, and 10 to 90 mole percent of meta-phenylene diamine. The aromatic bis(ether phthalic anhydride) is preferably 3,3'-bisphenol A dianhydride, 4,4'-bisphenol A dianhydride, or a combination comprising at least one of the foregoing. The diaminodiphenyl sulfone is preferably 3,3'-diaminodiphenyl sulfone, 4,4'-diaminodiphenyl sulfone, or a combination comprising at least one of the foregoing, more preferably 3,3'-diaminodiphenyl sulfone. The copolyimide has a glass transition temperature of greater than or equal to 250° C., preferably 250 to 275° C.

In an embodiment, the copolyimide is the reaction product of an aromatic dianhydride component comprising, based on the total moles of the aromatic anhydride component, 60 to 90 mole percent pyromellitic dianhydride and 10 to 40 mole percent of the aromatic bis(ether phthalic anhydride), and an organic diamine component comprising, based on the total moles of the organic diamine component, 60 to 90 mole percent diaminodiphenyl sulfone, and 10 to 40 mole percent of meta-phenylene diamine. The aromatic bis(ether phthalic anhydride) is preferably 3,3'-bisphenol A dianhydride, 4,4'-bisphenol A dianhydride, or a combination comprising at least one of the foregoing. The diaminodiphenyl sulfone is preferably 3,3'-diaminodiphenyl sulfone, 4,4'-diaminodiphenyl sulfone, or a combination comprising at least one of the foregoing. The copolyimide has a glass transition temperature of greater than or equal to 213° C., preferably 213 to 255° C.

In an embodiment, the copolyimide is the reaction product of an aromatic dianhydride component comprising, based on the total moles of the aromatic anhydride component, 10 to 50 mole percent pyromellitic dianhydride and 50 to 90 mole percent of the aromatic bis(ether phthalic anhydride), and an organic diamine component comprising, based on the total moles of the organic diamine component, 50 to 90 mole percent diaminodiphenyl sulfone, and 10 to 50 mole percent of meta-phenylene diamine. The aromatic bis(ether phthalic anhydride) is preferably 3,3'-bisphenol A dianhydride, 4,4'-bisphenol A dianhydride, or a combination comprising at least one of the foregoing. The diaminodiphenyl sulfone is preferably 3,3'-diaminodiphenyl sulfone, 4,4'-diaminodiphenyl sulfone, or a combination comprising at least one of the foregoing. The copolyimide has a glass transition temperature of greater than or equal to 213° C., preferably 213 to 255° C.

In an embodiment, the copolyimide is the reaction product of an aromatic dianhydride component comprising, based on the total moles of the aromatic anhydride component, 10 to 50 mole percent pyromellitic dianhydride and 50 to 90 mole percent of the aromatic bis(ether phthalic anhydride), and an organic diamine component comprising, based on the total moles of the organic diamine component, 10 to 50 mole percent diaminodiphenyl sulfone, and 50 to 90 mole percent of meta-phenylene diamine. The aromatic bis(ether phthalic anhydride) is preferably 3,3'-bisphenol A dianhydride, 4,4'-bisphenol A dianhydride, or a combination comprising at least one of the foregoing. The diaminodiphenyl sulfone is preferably 3,3'-diaminodiphenyl sulfone, 4,4'-diaminodiphenyl sulfone, or a combination comprising at least one of the foregoing. The copolyimide has a glass transition temperature of greater than or equal to 217° C., preferably 217 to 243° C.

The copolyimides can optionally further comprise a chain stopper, also referred to as a capping agent. A purpose of adding a chain stopper can be to limit the molecular weight of the polyimide, thus providing a polyimide with controlled molecular weight. In some embodiments, the chain stopper comprises a monofunctional amine, a monofunctional anhydride, or a combination comprising at least one of the foregoing. Examples of suitable monofunctional amine chain stoppers can include aromatic primary amines, for example, aniline, chloroaniline, perfluoromethyl aniline, naphthyl amines, and the like. Aromatic primary monofunctional amines can optionally have additional functionality bound to the aromatic ring: such as, but not limited to, aryl groups, alkyl groups, aryl-alkyl groups, sulfone groups, ester groups, amide groups, halogens, halogenated alkyl or aryl groups, alkyl ether groups, aryl ether groups, or aryl keto groups, provided that the attached functionality does not impede the function of the aromatic primary monoamine to control polyimide molecular weight. Aromatic primary monofunctional amines containing hydrogen, ethers, sulfones, and perfluoroalkyl groups are preferred. Aromatic monofunctional anhydrides, i.e., aromatic groups comprising one cyclic anhydride group, can also be used to control molecular weight of the polyimides. Illustrative examples include phthalic anhydride, substituted phthalic anhydrides, such as chlorophthalic anhydride, and the like, or a combination comprising at least one of the foregoing. The monofunctional anhydrides can have additional functionality bound to the aromatic ring, illustrative examples of which comprise those functionalities described above for aromatic primary monofunctional amines. When present, the chain stopper can be included in the copolyimide in an amount of 1.5 to 5 mole percent, based on the total moles of the dianhydride component.

In some embodiments, the chain stopper can be added to the copolyimide before, during, or at the end of the polymerization or as part of a prepolymer prior to melt polymerization. Preferably, the chain stopper can be added at the beginning or during the polymerization. In some embodiments, the polyimides of the present disclosure do not include a chain stopper (i.e., no chain stopper is intentionally added to the polyimide). In some embodiments, a chain-stopper can be added when the polymerization reaction reaches greater than 90% conversion, or greater than 95% conversion, or greater than 98% conversion. In some embodiments, the chain-stopper can be incorporated into prepolymer chain ends prior to melt polymerization. In some embodiments, the chain-stopper can be added to the prepolymer prior to melt polymerization. Any chain-stopper can be added in one or more portions. In another embodiment, a chain stopper can be combined with the aromatic anhydride component or the organic diamine component and added together to a reaction mixture.

The copolyimides of the present disclosure can be prepared by any methods that are generally known, including the reaction of the above described aromatic dianhydride component with the above described organic diamine component. In some embodiments, the copolyimide can have a number average molecular weight 500 to 200,000 Daltons (Da), or 500 to 100,000 Da, or 1,000 to 100,000 Da, or 5,000 to 100,000 Da, or 10,000 to 100,000 Da, or 15,000 to 85,000 Da, or 18,000 to 65,000 Da. In some embodiments, the copolyimide can have a weight average molecular weight of at least 15,000 Da, or 20,000 to 100,000 Da, or 20,000 to 60,000 Da. Number average and weight average molecular weight of the copolyimides can be determined by gel permeation chromatography (GPC) relative to polystyrene standards, eluting with a suitable solvent, for example dichloromethane (DCM), a 50:50 mixture of hexafluoroisopropanol and dichloromethane (HFIP/DCM), a mixture of dichloroacetic acid and phenol, N-methyl-2-pyrrolidone (NMP), and dimethyl acetamide (DMAC), preferably dichloromethane.

The copolyimides exhibit a number of desirable physical properties.

The copolyimides can have a glass transition temperature (Tg) of greater than or equal to 210° C. In some embodiments, the copolyimides can have a Tg of 213 to 365° C. In some embodiments, the copolyimides can have a Tg of 220 to 290° C. In some embodiments, the copolyimides can have a Tg of 255 to 280° C. Glass transition temperature can be determined using differential scanning calorimetry (DSC), using a heating rate of 20° C. per minute.

The copolyimides can have an onset decomposition temperature of greater than or equal to 500° C., as determined by thermogravimetric analysis (TGA) under a nitrogen or air atmosphere at the onset of decomposition. In some embodiments, the decomposition temperature can be 500 to 600° C., or 500 to 575° C. In some embodiments, under a nitrogen atmosphere, the decomposition temperature can be 500 to 560° C. In some embodiments, under an air atmosphere, the decomposition temperature can be 500 to 570° C.

The copolyimides can have a water uptake of less than or equal to 3.2%, preferably 1.0 to 3.2%, more preferably 1.1 to 2.85%, even more preferably 1.1 to 2.5%, determined by comparing the difference in the weight of a polyimide film that has been immersed in water for 24 hours with the dry weight of the same polyimide film prior to immersion in water.

The copolyimides can have a coefficient of thermal expansion of 20 to 55 ppm/° C. or 30 to 55 ppm/° C., or 40 to 55 ppm/° C., as determined according to ASTM E 831.

A film prepared from the copolyimide having a thickness of 20 to 100 micrometers can have a transmission of at least 85%, preferably at least 90% at one or more of 850 nm, 1310 nm, or 1550 nm as measured on an ultraviolet-visible/near infrared spectrophotometer.

The copolyimide can have a residual solvent content of less than 1000 parts per million, preferably less than 500 parts per million by weight of the copolyimide. The residual solvent can be an organic solvent, for example, a halogenated aliphatic hydrocarbon (e.g., trichloromethane), a halogenated aromatic hydrocarbon (e.g., chlorobenzene, ortho-dichlorobenzene, 1,2,4-trichlorobenzene, dichlorotoluene, and the like, or a combination comprising at least one of the foregoing), a N—($C_{1-6}$ alkyl) $C_{5-20}$ aliphatic lactam (e.g., N-methylpyrrolidinone), a N—($C_{1-6}$ alkyl) $C_{5-20}$ aliphatic amide (e.g. dimethylacetamide, dimethylformamide, and the like, or a combination comprising at least one of the foregoing), cresol (e.g., meta-cresol, ortho-cresol, para-cresol, or a combination comprising at least one of the foregoing), anisole, veratrole, diphenyl sulfone, sulfolane, diphenylether, phenetole, dimethylsulfoxide, acetone, methanol, ethanol, or a combination comprising at least one of the foregoing. Preferably, the residual solvent can be chlorobenzene, dichlorotoluene, 1,2,4-trichlorobenzene, ortho-dichlorobenzene, N-methylpyrrolidone, dimethylacetamide, dimethylformamide, meta-cresol, ortho-cresol, para-cresol, anisole, veratrole, diphenyl sulfone, diphenylether, sulfolane, phenetole, dimethylsulfoxide, trichloromethane, acetone, methanol, ethanol, or a combination comprising at least one of the foregoing.

The copolyimide can exhibit a shift in melt viscosity of less than 30% over 30 minutes at 380° C. under a nitrogen atmosphere as measured in a small amplitude oscillatory time sweep rheology at a fixed angular frequency of 10 radians per second.

The copolyimide can exhibit a char yield of greater than 30 weight percent, as determined using thermogravimetric analysis under an inert atmosphere of nitrogen.

In an embodiment, the copolyimide can exhibit at least one of a glass transition temperature greater than or equal to 210° C., preferably 213 to 365° C., or 220 to 290° C., or 255 to 280° C. as determined by differential scanning calorimetry; an onset decomposition temperature of greater than or equal to 500° C., as determined by thermogravimetric analysis under nitrogen or air; has a water uptake of less than or equal to 3.2%, preferably less than 2.85%, more preferably less than 1.1%, determined by comparing the difference in the weight of a polyimide film that has been immersed in water for 24 hours with the dry weight of the same polyimide film prior to immersion in water; a coefficient of thermal expansion of 20 to 55 ppm/° C., or 30 to 55 ppm/° C., or 40 to 55 ppm/° C., as determined according to ASTM E 831; and a transmission of at least 85%, preferably at least 90% at one or more of 850 nm, 1310 nm, or 1550 nm as measured on an ultraviolet-visible/near infrared spectrophotometer using a 20 to 100 micrometer-thick film of the copolyimide. In an embodiment, the copolyimide can exhibit at least 2, or at least 3, or at least 4 of the above properties. In an embodiment, the copolyimide exhibits each of the above properties.

The copolyimides described herein can be useful in preparing a polymer composition comprising the copolyimide and a thermoplastic polymer. The copolyimide can be present in the polymer composition in an amount of 1 to 99 weight percent, and the thermoplastic polymer can be present in an amount of 1 to 99 weight percent, each based on the total weight of the polymer composition.

The thermoplastic polymer can include, for example polyacetals (e.g., polyoxyethylene and polyoxymethylene), poly($C_{1-6}$ alkyl)acrylates, polyacrylamides (including unsubstituted and mono-N— and di-N—($C_{1-8}$ alkyl)acrylamides), polyacrylonitriles, polyamides (e.g., aliphatic polyamides, polyphthalamides, and polyaramides), polyamideimides, polyanhydrides, polyarylene ethers (e.g., polyphenylene ethers), polyarylene ether ketones (e.g., polyether ether ketones (PEEK) and polyether ketone ketones (PEKK), polyarylene ketones, polyarylene sulfides (e.g., polyphenylene sulfides (PPS)), polyarylene sulfones (e.g., polyethersulfones (PES), polyphenylene sulfones (PPSU), and the like), polybenzothiazoles, polybenzoxazoles, polybenzimidazoles, polycarbonates (including homopolycarbonates and polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetherimides (including copolymers such as polyetherimide-siloxane copolymers), polyimides (including copolymers such as polyimide-siloxane copolymers), poly($C_{1-6}$ alkyl)methacrylates, polymethacrylamides (including unsubstituted and mono-N— and di-N—($C_{1-8}$ alkyl)acrylamides), cyclic olefin polymers (including polynorbornenes and copolymers containing norbornenyl units, for example copolymers of a cyclic polymer such as norbornene and an acyclic olefin such as ethylene or propylene), polyolefins (e.g., polyethylenes, polypropylenes, and their halogenated derivatives (such as polytetrafluoroethylenes), and their copolymers, for example ethylene-alpha-olefin copolymers, polyoxadiazoles, polyoxymethylenes, polyphthalides, polysilazanes, polysiloxanes (silicones), polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, vinyl polymers (including polyvinyl alcohols, polyvinyl esters, polyvinyl ethers, polyvinyl halides (e.g, polyvinyl fluoride), polyvinyl ketones, polyvinyl nitriles, polyvinyl thioethers, and polyvinylidene fluorides), a liquid crystalline polymer, or the like. A combination comprising at least one of the foregoing thermoplastic polymers can be used.

In some embodiments, the thermoplastic polymer is a polyarylene ether ketone, a polybenzimidazole, a polyarylene sulfone, a polyarylene sulfide, a polyarylene ether, a polyimide, a polyamide imide, a polyetherimide (including copolymers such as polyetherimide-siloxane copolymers), a liquid crystalline polymer, or a combination comprising at least one of the foregoing.

In some embodiments, the polymer composition can further optionally include one or more additives that are generally known in the art to be useful for polymer compositions, with the proviso that the one or more additives do not significantly adversely affect one or more of the desired properties of the polymer composition. For example, the additive(s) can include a thermal stabilizer, a hydrolysis stabilizer, an ultraviolet light stabilizer, a nucleating agent, a metal deactivator, a colorant, an antioxidant, or a combination comprising at least one of the foregoing additives. The additive(s) can generally be included in any amount that is known to be effective, for example 0 to 20 weight percent, for example 0.1 to 10 weight percent based on the total weight of the polymer composition.

The copolyimides of the present disclosure are suitable for the preparation of a variety of articles for many applications. Examples of applications for these articles can include food service, medical service applications, e.g., medical processes, lighting, lenses, sight glasses, windows, enclosures, safety shields, and the like. Examples of articles can include, but are not limited to, fibers, sheets, films, multilayer sheets, multilayer films, molded parts, extruded profiles, coated parts and foams, windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment, instrument panels, medical devices, plates, helmets, animal cages, enclosures for electrical equipment, engine parts, automotive engine parts, electric motor parts, power distribution equipment, computers, and the like. In some embodiments, exemplary articles comprising the copolyimide can include a fiber, a film, a layer, a conformal coating, a molded article, an extruded article, a membrane, a prepreg, a pellet, a powder, a foam, tubing, a flake, or a composite.

The articles can be prepared by any suitable method, including shaping, extruding, or molding (e.g., injection molding, compressing molding, blow molding, thermoforming, rotational molding, and the like) the copolyimide or a composition comprising the copolyimide. In some embodiments, an article comprising the copolyimide can be an injection molded article.

In some embodiments, an article comprising the copolyimide can be a film. A film comprising the copolyimide can be prepared by any method that is generally known, for example by solvent casting, extrusion, and the like. In some embodiments, the film can be prepared by casting or coating a solution comprising the copolyimide (or the corresponding copolyamic acid) onto a substrate to form the film. The solvent can be removed by evaporation assisted by additional air streams including heated air, heated inert gas like nitrogen or steam heated rolls to better control the temperature of the carrier layer.

In some embodiments, the film can have a thickness of 0.1 to 1500 micrometers, specifically 1 to 750 micrometers, more specifically 10 to 150 micrometers, and even more specifically 10 to 100 micrometers.

In some embodiments, the film is a transparent film. For example, the film can have a transparency of at least 85%, preferably at least 90%, determined at one or more of 850 nanometers (nm), 1310 nm, and 1550 nm on a film having a thickness of 28 to 83 µm, as measured on an ultraviolet-visible/near infrared spectrophotometer. In some embodiments, the film has a transparency of at least 85%, preferably at least 90% at 850 nm. Furthermore, the film comprising the copolyimide of the present disclosure can advantageously be creasable (i.e., the films are not brittle).

Articles comprising the copolyimide or a composition formed therefrom can be particularly useful for various high heat optical and optoelectronic applications due to the good balance of thermal and optical properties as described above. Optically relevant articles can include, but are not limited to, an optical component, an optical connector, an optical lens, an optical filter, an optical fiber, an optical fiber connector, optoelectronic packaging, precision optical components, optical waveguides, and sight glass. The copolyimide or a composition formed therefrom can also be used to form articles including, but not limited to an electrical connector, a light-emitting diode reflector, a printed circuit board substrate, reflector for automotive headlamp, component of a fuel system for a gasoline engine, a diesel engine, an aircraft jet engine, or an aircraft turboprop engine, a fuel bowl, an adhesive, or a fuel filter housing.

The present disclosure also extends to a method of manufacturing a polyimide film. In an embodiment, the method comprises casting a solution comprising a copolyamic acid corresponding to the above described copolyimide, and a liquid carrier on a substrate to provide a copolyamic acid film. The copolyamic acid can be prepared by contacting an aromatic dianhydride component with an organic diamine component. The aromatic dianhydride component comprises a substituted or unsubstituted pyromellitic dianhydride or a functional derivative thereof and an aromatic bis(ether phthalic anhydride) or a functional derivative thereof, as described above. The aromatic bis(ether phthalic anhydride) is of the formula (I)

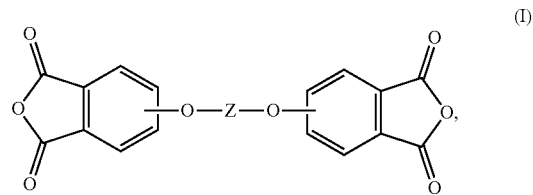

wherein Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, and the divalent bonds of the —O—Z—O— group are in the 3,3', 3,4', 4,3', or the 4,4' positions, preferably in the 4,4' position. In some embodiments, Z is a residue of bisphenol A (i.e., Z is 2,2'-isopropylidene). In some embodiments, the aromatic dianhydride component comprises unsubstituted pyromellitic dianhydride. The aromatic bis(ether phthalic anhydride) can be present in an amount of 10 to 90 mole percent, and the substituted or unsubstituted phthalic anhydride can be present in an amount of 10 to 90 mole percent, each based on the total moles of the aromatic dianhydride component. The organic diamine component comprises a substituted or unsubstituted phenylene diamine and a diaminodiphenyl sulfone, as described above. In some embodiments, the phenylene diamine is meta-phenylene diamine. In some embodiments, the diaminodiphenyl sulfone is 3,3'-diaminodiphenyl sulfone, 4,4'-diaminodiphenyl sulfone, or a combination comprising at least one of the foregoing. The substituted or unsubstituted phenylene diamine can be present in an amount of 10 to 90 mole percent, and the diaminodiphenyl sulfone can be present in an amount of 10 to 90 mole percent, each based on the total moles of the organic diamine component.

The copolyamic acid film can be cured to provide the polyimide film. The curing can be by thermal curing, curing under vacuum, chemical imidization, or a combination thereof. In some embodiments, the curing comprises chemical imidization conducted in the presence of a chemical imidization agent. Suitable chemical imidization agents are generally known. For example, the chemical imidization agent can be a dehydrating chemical, for example acetic anhydride, or an organic base, including pyridine, phosphoramide, triethylamine, or the like. In some embodiments, the curing comprises thermal curing, for example heating the film to a temperature of 200 to 400° C., preferably 200 to 350° C., for a time from 10 minutes to 3 hours, preferably 15 minutes to 1 hour. The imidization can be conducted under an inert gas during the heating. Examples of such gases are dry nitrogen, helium, argon and the like. Dry nitrogen is generally preferred. In an advantageous feature, such blanketing is not required. The imidization is generally conducted at atmospheric pressure. The liquid carrier can be ortho-dichlorobenzene, dimethyl formamide, dimethyl acetamide, N-methylpyrrolidone, sulfolane, diphenyl sulfone, dimethyl sulfone, m-cresol, diphenyl ether, hexamethyl phosphoramide, dimethyl imidazole, dimethyl sulfoxide, tetramethylurea, N-ethylpyrrolidone, veratrole, anisole, tetrahydrofuran, 1,4-dioxane, dimethyl carbonate, N-methylcaprolactam, an aliphatic alcohol, water, or a combination comprising at least one of the foregoing. The aliphatic alcohol can be a $C_{1-6}$ aliphatic alcohol, for example, methanol, ethanol, isopropanol, and the like.

heat performance, low water uptake, low coefficients of thermal expansion, good mechanical properties, and excellent transparency. Due to the combination of desirable properties, the copolyimides described herein can be utilized in optical applications. Therefore, a substantial improvement in copolyimides is provided, in particular copolyimides for high heat optical applications.

Further information is provided by the following non-limiting examples.

EXAMPLES

Materials for the following examples are listed in Table 1.

TABLE 1

| Component | Description | Source |
|---|---|---|
| 4,4'-BPADA | 4,4'-Bisphenol A Dianhydride [CAS Reg. No. 38103-06-9] | SABIC |
| 3,3'-BPADA | 3,3'-Bisphenol A Dianhydride [CAS Reg. No. 52256-80-1] | SABIC |
| PMDA | Pyromellitic Dianhydride [CAS Reg. No. 89-32-7] | Fisher Scientific |
| mPD | meta-Phenylene Diamine [CAS Reg. No. 108-45-2] | Fisher Scientific |
| 3,3'-DDS | 3,3'-Diaminodiphenyl Sulfone [CAS Reg. No. 599-61-1] | Fisher Scientific |
| 4,4'-DDS | 4,4'-Diaminodiphenyl sulfone [CAS Reg. No. 80-08-0] | Fisher Scientific |
| DMAc | N,N'-Dimethyl Acetamide [CAS Reg. No. 127-19-5] | Fisher Scientific |
| NMP | 1-Methyl-2-Pyrrolidinone [CAS Reg. No. 872-50-4] | Fisher Scientific |
| PEI | Polyetherimide made from the reaction of bisphenol A dianhydride with meta-phenylene diamine, having a glass transition temperature of 217° C., available as ULTEM 1010 | SABIC |
| PEI-S1 | Polyetherimide made from the reaction of 3,3'-bischlorophthalimide with bisphenol A salt, having a glass transition temperature of 267° C., available as EXTEM XH1015 | SABIC |
| PEI-S2 | Polyetherimide made from the reaction of 4,4'-bisphenol A dianhydride with 4,4'-diaminodiphenylsulfone, having a glass transition temperature of 247° C., available as ULTEM XH6050. | SABIC |

In some embodiments, a polyimide film can be manufactured by extruding a solution comprising a copolyamic acid corresponding to the above described copolyimide, and a liquid carrier to provide a polyimide film. The polyamic acid can be prepared as described above. The liquid carrier can be ortho-dichlorobenzene, dimethyl formamide, dimethyl acetamide, N-methylpyrrolidone, sulfolane, diphenyl sulfone, dimethyl sulfone, m-cresol, diphenyl ether, hexamethyl phosphoramide, dimethyl imidazole, dimethyl sulfoxide, tetramethylurea, N-ethylpyrrolidone, veratrole, anisole, tetrahydrofuran, 1,4-dioxane, dimethyl carbonate, N-methylcaprolactam, an aliphatic alcohol, water, or a combination comprising at least one of the foregoing. The aliphatic alcohol can be a $C_{1-6}$ aliphatic alcohol, for example, methanol, ethanol, isopropanol, and the like. The extruding is preferably a reactive extrusion process, wherein the copolyamic solution undergoes concentration, solvent removal, and imidization by a curing process (e.g., thermal curing) in one vessel. The extruder is preferably a counter-rotating twin-screw Haake extruder. The temperature of the extruder can be 350 to 450° C., for example 370 to 400° C. The residence time of the polyamic acid solution in the extruder can be from 10 minutes to 1 hour, and the extruder can be rotated at 50 to 100 rpm. Thus, using a reactive extrusion process allows for imidization and film formation to be conducted in a single step.

Provided herein is a copolyimide that is the reaction product of specific amounts of an aromatic dianhydride component comprising a pyromellitic dianhydride and an aromatic bis(ether phthalic anhydride) and an organic diamine component comprising a phenylene diamine and a diaminodiphenyl sulfone. The copolyimides possess high General Procedure for Polyimide Synthesis A polyimide copolymer (4.45 grams) comprising repeat units derived from BPADA, PMDA, and DDS is made according to the following procedure: methanol (5 grams) was added to of DDS (1.908 grams, 0.00768 mmol). The mixture was heated in a sealed pressure tube until dissolved completely. BPADA (2.00 g, 0.00384 mmol) was added to a tube followed by methanol (3.6 grams), and the mixture was heated until a homogeneous solution was obtained. PMDA (0.0.838 g, 0.00384 mmol) was added and heated until a homogeneous solution formed. The material was then poured in aluminum pan to evaporate methanol. Finally, the polymeric concentrate was heated at 385° C. for 15 to 20 minutes to obtain golden yellow colored polymer which was then hot pressed at 650 to 740° F. to form a highly creasable polymer film.

General Procedure for Polyamic Acid Synthesis

Typically, 1 molar equivalent of the dianhydride (BPADA and/or PMDA), relative to the diamine component, was added to 3.70 to 7.45 milliliters (mL) of anhydrous dimethyl acetamide (DMAc). The dianhydride was weighed under inert atmosphere (e.g., inside a glove box). The solution of dianhydride was sonicated in a sonicator bath for about 15 minutes to effect dissolution. An equivalent molar amount of diamine (mPD and/or DDS) (i.e., 1:1 molar stoichiometry of diamine to dianhydride, no chain stopper) was then added to the solution. The theoretical mass of expected polymer (e.g., 0.5 to 1.0 grams) was used to calculate 12.5 weight percent solids in DMAc. The vial containing the monomers and DMAc was purged with nitrogen gas prior to attachment of cap, and ultra-sonicated with no heat for 20 minutes to effect dissolution. The vial was then placed on a flat-bed shaker and agitated for 14 to 16 hours, affording a viscous polyamic acid solution that was colorless to light brown in color.

At room temperature, 2 mL of the polyamic acid solution was drawn in to a 3 mL syringe. The solution was filtered through a 0.45 micrometer (μm) polytetrafluoroethylene (PTFE) syringe filter and applied to a cleaned glass slide and spread to make a thin film. The glass slide was positioned on an aluminum sheet of a film developer. The aluminum riser including a Gortex spacer was placed on the aluminum plate and the quartz cover was set so that small gaps appeared at the top of the angled riser allowing for vapor to escape. The chamber was purged with nitrogen gas for 20 minutes prior to the initiation of thermal curing.

Thermal Curing Process

Thermal curing was carried out using a DigiTrol II temperature controller. The temperature profile for the thermal curing process is provided in Table 2. The temperature profile was set up to start at room temperature (25° C.) and slowly ramp up the temperature to 375° C. The heat was turned off once 375° C. was reached. The resulting film was cooled to room temperature and then immersed in room temperature DI water for 10 to 12 hours to remove the cured film from the glass slide.

Procedure for Glass Transition Temperature by DSC

Differential scanning calorimetry (DSC) measurements of the polymer film samples were performed with a TA Q1000 DSC instrument. The film samples were scanned from 40 to 400° C. under nitrogen atmosphere. The glass transition temperature (Tg), and the melting temperature (Tm) of the polymers were determined from the second heating scan. Heating rate of 20° C./min was used in these experiments.

Procedure for Thermal Mechanical Analysis (TMA)

TMA analysis of polymer film samples was performed on a TA instruments Q400 at 5° C./min ramp rate. Coefficient of thermal expansion (CTE) in ppm/° C. was determined in the 50 to 170° C. temperature range.

o-DCB Solubility Test

The polymer films were cut into small pieces and weighed into a scintillation vial. ortho-Dichlorobenzene (o-DCB) was added to the vial in an amount sufficient to provide a 5 wt % polymer solution. The vials were degassed and placed on a 20 mL scintillation hot block (from ChemGlass) and heated to 90° C., 120° C., and 150° C. to determine the solubility of polymer material in o-DCB at each temperature.

TABLE 2

| Temp. (° C.) | 25 | 40 | 40 | 120 | 120 | 160 | 160 | 200 | 200 | 375 |
|---|---|---|---|---|---|---|---|---|---|---|
| Time (min) | 0 | 45 (ramp) | 15 (soak) | 30 (ramp) | 30 (soak) | 30 (ramp) | 15 (soak) | 15 (ramp) | 15 (soak) | 30 (ramp) |

Procedure for Water Uptake Measurements

Samples of the cured polymer films were cut to a size of at least 2 centimeters×2 centimeters and weighed. The weight was recorded as M1. The samples were dried in a vacuum oven at 120° C. for 24 hours. Following cooling to room temperature under vacuum, the samples were quickly weighed (recorded as M2) and immersed in DI water for 24 hours. The samples were removed from the water, wiped dry, and weighed again (recorded as M3). The water absorption was calculated using the formula: Water absorption (%)=(M3−M2)*100/M2.

Procedure for Molecular Weight Analysis by GPC

Molecular weights were determined by gel permeation chromatography (GPC) analysis with a Waters 2695 Separations Module equipped with a Polymer Labs Plgel 5 μm MIXED-C column and Waters 2487 PDA detector at 254 nanometers. Elution was effected with an isocratic solvent system of dichloromethane flowing at a rate of 1 mL/min. Number average molecular weight (Mn) of the polymer samples is reported relative to polystyrene standards obtained from Polymer Labs. Each sample was run for 15 minutes with an injection volume of 5 μL. Samples were prepared for injection by dissolving in dichloromethane (DCM) (5 to 10 mg of sample in 10 mL of dichloromethane). Several polymers showed no solubility in DCM, 50:50 HFIP/MeCl$_2$, dichloroacetic acid/phenol, NMP, or DMAC.

Procedure for TGA Measurements

Thermogravimetric analysis (TGA) measurements of the polymer film sample were performed with a TA Q800 TGA instrument. Separate samples were scanned from 40° C. to 800° C. under the nitrogen and air atmosphere with a heating rate of 20° C./min.

Representative Solvent Casting Formulation

A polyimide copolymer (1 gram) comprising repeat units derived from BPADA (0.3973 g, 0.7631 mmol), PMDA (0.2775 g, 1.2687 mmol), mPD (0.0825 g, 0.7631 mmol), and 3,3'-DDS (0.3159 g, 1.2687 mmol) was added to 7.47 mL of anhydrous DMAc. The dianhydride component of the copolymer comprised 62.5 mole percent PMDA and 37.5 mole percent of BPADA. The diamine component of the copolymer comprised 37.5 mole percent of mPD and 62.5 mole percent of 3,3'-DDS. The polyimide solution was mixed for 16 hours of a flat-bed shaker, and a viscous dark brown solution was obtained. Thermal curing of this solution resulted in a brown-colored, highly creasable film.

Examples 1-20

For each of examples 1-20 (E1-E20), the copolymers included repeating units derived from 4,4'-BPADA, PMDA, mPD, and 3,3'-DDS in the amounts shown in Tables 3a and 3b. The chemical scheme of FIG. 1 further describes the synthesis and structure of the copolymers of the examples. The amount of each dianhydride component (4,4'-BPADA and PMDA) is shown as mole percent based on the total moles of the dianhydride components (i.e., moles of 4,4'-BPADA+moles of PMDA). The amount of each diamine component (mPD and 3,3'-DDS) is shown as mole percent based on the total moles of the diamine components (i.e., moles of mPD+moles of 3,3'-DDS). Following casting and curing the polyimide films, the films were characterized as shown in Tables 3a and 3b.

TABLE 3a

|  | E1 | E2 | E3 | E4 | E5 | E6 | E7 | E8 | E9 | E10 |
|---|---|---|---|---|---|---|---|---|---|---|
| Component |  |  |  |  |  |  |  |  |  |  |
| 4,4'-BPADA | 25 | 50 | 50 | 75 | 50 | 75 | 50 | 0 | 100 | 0 |
| PMDA | 75 | 50 | 50 | 25 | 50 | 25 | 50 | 100 | 0 | 100 |
| mPD | 50 | 75 | 100 | 50 | 50 | 75 | 25 | 100 | 0 | 0 |
| 3,3'-DDS | 50 | 25 | 0 | 50 | 50 | 25 | 75 | 0 | 100 | 100 |
| Properties |  |  |  |  |  |  |  |  |  |  |
| Tg (° C.) | 290 | 241 | 243 | 233 | 255 | 232 | 251 | NO | 214 | 335 |
| Film Quality[1] | MB | MB | MB | HC | HC | HC | MC | CB | HC | MB |

[1]NO: Not observed; HC = Highly creasable; MC = Moderately creasable; MB = Moderately brittle; VB = Very brittle; CB = Completely brittle TABLE 3b

|  | E11 | E12 | E13 | E14 | E15 | E16 | E17 | E18 | E19 | E20 |
|---|---|---|---|---|---|---|---|---|---|---|
| Component |  |  |  |  |  |  |  |  |  |  |
| 4,4'-BPADA | 25 | 0 | 100 | 75 | 50 | 25 | 12.5 | 12.5 | 87.5 | 87.5 |
| PMDA | 75 | 100 | 0 | 25 | 50 | 75 | 87.5 | 87.5 | 12.5 | 12.5 |
| mPD | 25 | 50 | 50 | 25 | 0 | 75 | 87.5 | 12.5 | 12.5 | 87.5 |
| 3,3'-DDS | 75 | 50 | 50 | 75 | 100 | 25 | 12.5 | 87.5 | 87.5 | 12.5 |
| Properties |  |  |  |  |  |  |  |  |  |  |
| Tg (° C.) | 288 | 364 | 231 | 213 | 249 | NO | NO | 302 | 222 | 226 |
| Film Quality[1] | MB | CB | HC | HC | MC | VB | CB | HC | HC | HC |

[1]NO: Not observed; HC = Highly creasable; MC = Moderately creasable; MB = Moderately brittle; VB = Very brittle; CB = Completely brittle As shown in Tables 3a and 3b, varying the polymer composition can greatly affect the properties of the resulting copolyimides. As illustrated by examples 1, 8, 12, and 16 to 17, polymers comprising greater than 50 mole percent of PMDA based on the total moles of PMDA+4,4'-BPADA and greater than or equal to 50 mole percent mPD based on the total moles of mPD and DDS were generally observed to be brittle ("CB", "VB", or "MB"). Copolyimides having this composition also had glass transition temperatures greater than 290° C., except in examples 8, 16, and 17, where no Tg was observed.

As illustrated by examples 4 to 6, 13, and 20, polymers comprising greater than or equal to 50 mole percent of 4,4'-BPADA based on the total moles of PMDA+4,4'-BPADA and greater than or equal to 50 mole percent mPD based on the total moles of mPD and DDS were generally observed to form highly creasable ("HC") films, and demonstrated Tgs of 217 to 243° C. The copolymers of examples 2 and 3 comprising 50 mole percent PMDA and 75 mole percent mPD (example 2) and 100 mole percent mPD (example 3) provided films that were moderately brittle and having Tg of 241-243° C.

As illustrated by examples 10 to 11 and 18, polymers comprising greater than 50 mole percent of PMDA based on the total moles of PMDA+4,4'-BPADA and greater than 50 mole percent DDS based on the total moles of mPD and DDS were generally observed to form moderately to completely brittle films, with the exception of example 18, which afforded a creasable film. The Tg of the copolymers of examples 10 to 11 and 18 were observed to be greater than 288° C.

As illustrated by examples 7, 9, 14 to 15, and 19, polymers comprising greater than or equal to 50 mole percent of 4,4'-BPADA based on the total moles of PMDA+ 4,4'-BPADA and greater than 50 mole percent DDS based on the total moles of mPD and DDS were generally observed to form highly creasable polymer films, with lower Tg (e.g., less than 251° C.).

Examples 21-37

For some high heat applications, it is desirable to provide a polyimide having a high glass transition temperature, for example greater than 265° C. Additionally, polymers which can provide films having good creasability are preferred. Based on these desired parameters and the results obtained for the polyimides of examples 1-20, additional polyimides were prepared to determine the properties of polyimides including 12.5 to 37.5 mole percent 4,4'-BPADA, 62.5 to 87.5 mole percent PMDA, 0 to 37.5 mole percent mPD, and 62.5 to 100 mole percent 3,3'-DDS. The results are provided as examples 21-37 (E21-E37) in Table 4 below.

TABLE 4a

|  | E21 | E22 | E23 | E24 | E25 | E26 | E27 | E28 | E29 | E30 |
|---|---|---|---|---|---|---|---|---|---|---|
| Component |  |  |  |  |  |  |  |  |  |  |
| 4,4'-BPADA | 12.5 | 12.5 | 12.5 | 18.75 | 18.75 | 18.75 | 25 | 25 | 25 | 25 |
| PMDA | 87.5 | 87.5 | 87.5 | 81.25 | 81.25 | 81.25 | 75 | 75 | 75 | 75 |

TABLE 4a-continued

|  | E21 | E22 | E23 | E24 | E25 | E26 | E27 | E28 | E29 | E30 |
|---|---|---|---|---|---|---|---|---|---|---|
| mPD | 0 | 18.75 | 37.5 | 9.38 | 18.75 | 28.13 | 0 | 9.38 | 18.75 | 28.13 |
| 3,3'-DDS | 100 | 81.25 | 62.5 | 90.67 | 81.25 | 71.87 | 100 | 90.67 | 81.25 | 71.87 |
| Properties | | | | | | | | | | |
| Tg (° C.) | 287 | 307 | 308 | NM | NM | 296 | 280 | 276 | 278 | 279 |
| Film Quality[1] | CB | HC | CB | NM | NM | HC | HC | HC | MB | MC |

[1]NM: Not measured; HC = Highly creasable; MC = Moderately creasable; MB = moderately brittle; VB = Very brittle; CB = completely brittle TABLE 4b

|  | E31 | E32 | E33 | E34 | E35 | E36 | E37 |
|---|---|---|---|---|---|---|---|
| Component | | | | | | | |
| 4,4'-BPADA | 25 | 31.25 | 31.25 | 31.25 | 37.5 | 37.5 | 37.5 |
| PMDA | 75 | 68.75 | 68.75 | 68.75 | 62.5 | 62.5 | 62.5 |
| mPD | 37.5 | 9.38 | 18.75 | 28.13 | 0 | 18.75 | 37.5 |
| 3,3'-DDS | 62.5 | 90.67 | 81.25 | 71.87 | 100 | 81.25 | 62.5 |
| Properties | | | | | | | |
| Tg (° C.) | 282 | 272 | 272 | 273 | 259 | 264 | 264 |
| Film Quality[1] | MC | HC | HC | MC | HC | HC | HC |

[1]HC = Highly creasable; MC = Moderately creasable; MB = moderately brittle; VB = Very brittle; CB = completely brittle For each of examples 21-37, the copolymers included repeating units derived from 4,4'-BPADA, PMDA, mPD, and 3,3'-DDS in the amounts shown in Tables 4a and 4b. The amount of each dianhydride component (4,4'-BPADA and PMDA) is shown as mole percent based on the total moles of the dianhydride components (i.e., moles of 4,4'-BPADA+ moles of PMDA). The amount of each diamine component (mPD and DDS) is shown as mole percent based on the total moles of the diamine components (i.e., moles of mPD+ moles of DDS). Following casting and curing the polyimide films, the films were characterized as shown in Tables 4a and 4b.

As illustrated by examples 21-37 in Tables 4a and 4b, the majority of the formulations provided copolyimides having a Tg of greater than 259° C. Furthermore, the polymer films prepared from the copolyimides were generally found to be highly creasable, with the exception of examples 21, 23, 29 to 30, and 34 having higher amounts of PMDA or DDS.

Copolymers which provided films characterized as "creasable" to "moderately creasable" and having a glass transition temperature greater than 250° C. were analyzed for short term thermal stability using thermo-gravimetric analysis (TGA).

The thermal properties of the polymers tested, as well as the composition of each, are shown in Table 5.

TABLE 5

|  |  | E5 | E7 | E28 | E30 | E32 | E33 | E34 | E35 | E36 | E37 |
|---|---|---|---|---|---|---|---|---|---|---|---|
| Component | | | | | | | | | | | |
| 4,4'-BPADA | | 50 | 50 | 75 | 75 | 68.75 | 68.75 | 68.75 | 62.50 | 62.50 | 62.50 |
| PMDA | | 50 | 50 | 25 | 25 | 31.25 | 31.25 | 31.25 | 37.50 | 37.50 | 37.50 |
| mPD | | 50 | 25 | 9.38 | 28.13 | 9.38 | 18.75 | 28.13 | 0.00 | 18.75 | 37.50 |
| 3,3'-DDS | | 50 | 75 | 90.63 | 71.88 | 90.63 | 81.25 | 71.88 | 100 | 81.25 | 62.50 |
| Properties | | | | | | | | | | | |
| Tg (° C.) | | 255 | 251 | 276 | 279 | 272 | 272 | 273 | 259 | 264 | 265 |
| TGA | Air | 568 | 511 | 509 | 504 | 516 | 504 | 503 | 500 | 502 | 499 |
| (Onset T, ° C.) | N$_2$ | 513 | 513 | 503 | 503 | 504 | 501 | 505 | 504 | 504 | 507 |
| Film Quality[1] | | HC | MC | HC | MC | HC | VC | MC | HC | HC | HC |
| CTE (μm/(m · ° C.) | | NM | 41.16 | 30.64 | 26.00 | 21.89 | 28.19 | 28.27 | 27.53 | NM | 21.98 |
| Water absorption (23° C., sat) (%) | | 1.12 | 2.26 | 2.46 | 2.22 | 2.80 | 2.49 | 1.48 | 3.15 | 2.35 | 1.75 |
| % T @ 850 nm | | 92.3 | 91.7 | 95.9 | 93.4 | 92.5 | 92.9 | 93.4 | 90.9 | 93.2 | 91.3 |
| Film Thickness (μm) | | 59 | 51 | 40 | 28 | 68 | 33 | 28 | 83 | 61 | 48 |
| oDCB solubility at 150° C. | | INS | INS | INS | INS | INS | INS | INS | INS | INS | INS |

[1]NM: Not measured; HC = Highly creasable; VC = very creasable; MC = Moderately creasable Generally, all of the polymers showed onset-decomposition temperatures that were either comparable or superior to that of PEI, PEI-S1, or PEI-S2. The molecular weights of the copolymers could not be determined as the cured films were found to be insoluble in dichloromethane, hexafluoroisopropanol/dichloromethane, and other solvent mixtures. The manufacturing suitability of these polymers was also tested by evaluating the solubility in ortho-dichlorobenzene (oDCB) at 150° C. As shown in Table 5, all of the polymers tested were insoluble in oDCB.

Polymers comprising PMDA and DDS can increase the water absorption in a resultant polymer product. The water absorption of the materials shown in Table 5 ranged from 1.12 to 3.15%. The polymer of example 37, having the lowest amount of both PMDA and DDS with a higher Tg 265° C., was found to absorb less moisture than commercially available PEI-S1 (1.75% for Example 37 compared to 2.3% for PEI-S1) but absorbs more than PEI (1.25%). The percent transmission at 850 nm was also measured on the polymer films. Percent transmission was determined at one or more of 850 nm, 1310 nm, or 1550 nm using films having thickness of 20 to 100 micrometers and a Perkin Elmer LAMDA 950 ultraviolet-visible/near infrared spectrophotometer. The polymers generally showed excellent transparency with a percent transmission of greater than 90% at film thicknesses of 28 to 83 μm.

Figure 2A:
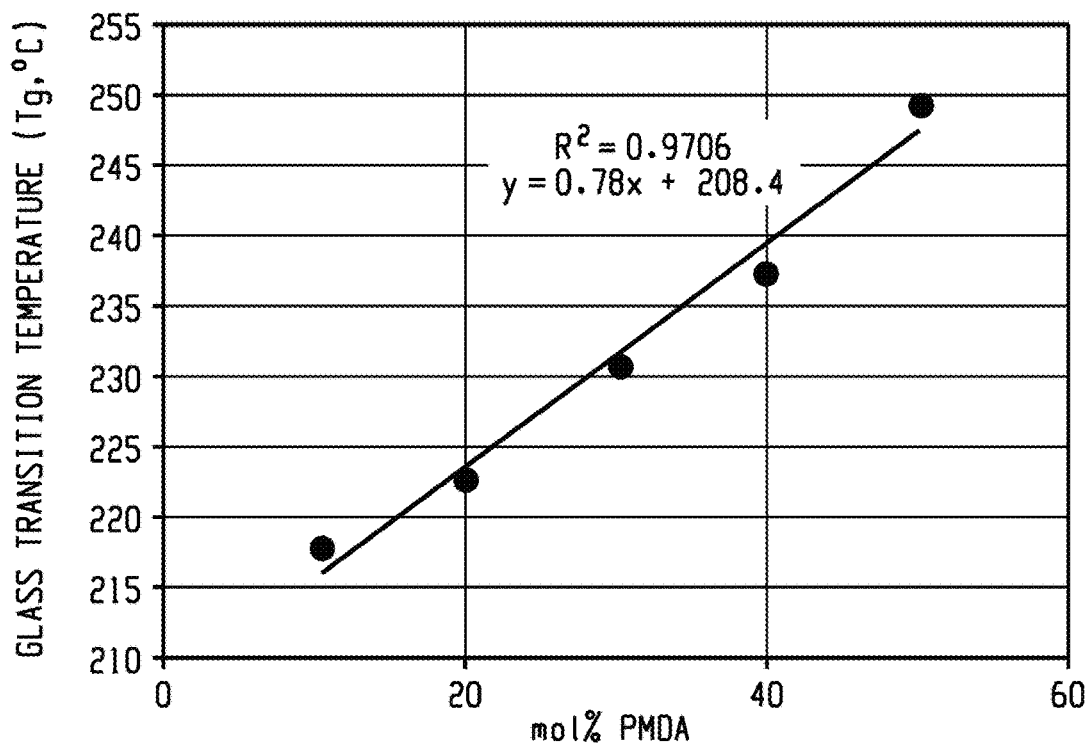
FIG. 2A is a graphical representation of the relationship between glass transition temperature of a copolyimide and mole percent of pyromellitic dianhydride incorporated in the copolyimide.
Figure 2B:
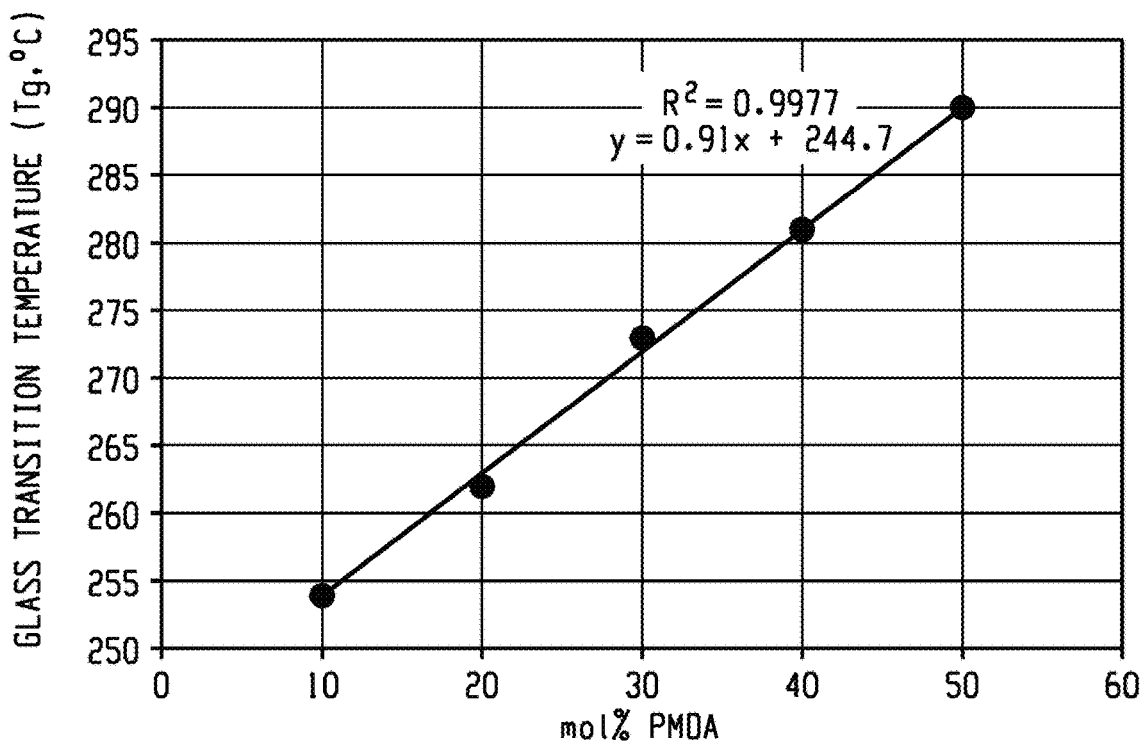
FIG. 2B is a graphical representation of the relationship between glass transition temperature of a copolyimide and mole percent of pyromellitic dianhydride incorporated in the copolyimide.

Additional polymers were prepared to determine the properties of polyimides based on 10 to 50 mole percent PMDA, 50 to 90 mole percent of 4,4'-BPADA, and 100 mole percent of DDS. The results are provided as examples 38 to 47 (E38 to E47) in Table 6 below. The amount of each dianhydride component (4,4'-BPADA and PMDA) is shown as mole percent based on the total moles of the dianhydride components (i.e., moles of 4,4'-BPADA+moles of PMDA). The amount of diamine component (DDS) is shown as mole percent based on the total moles of the diamine components (i.e., moles of DDS). The polyamic acid solutions were prepared in methanol as described above. The solutions were concentrated and cured at higher temperatures (e.g., 380° C. for 20 to 30 minutes under inert atmosphere), and the resultant films were characterized, as shown in Table 6. Each of the polymers of examples 38 to 47 afforded creasable films. All the examples further showed a linear increase in Tg as a function of mole percent of PMDA, as illustrated by FIGS. 2A and 2B. FIG. 2A shows the increase in Tg as a function of mole percent of PMDA for examples 38 to 42, and FIG. 2B shows the increase in Tg as a function of mole percent of PMDA for examples 40 to 47. The molecular weight of the soluble portion of the polymers of these examples was 18,000 to 65,000 Daltons. Higher molecular weights can be achieved, for example, by adjusting the stoichiometry of reaction monomers and the amount of chain stopper. The Tg of the copolymers of examples 42-47 were found to be greater than 250° C. The polymers showed onset-decomposition temperatures either comparable or superior to that of PEI, PEI-S1, or PEI-S2 (see Table 7). The polyimide of E42 obtained via the methanol route was found to be comparable in heat performance to that of the polyimide of example E15 (having identical formulation) obtained via the solvent casting route.

TABLE 6

|  |  | E38 | E39 | E40 | E41 | E42 | E43 | E44 | E45 | E46 | E47 |
|---|---|---|---|---|---|---|---|---|---|---|---|
| Component |||||||||||
| 4,4'-BPADA | | 90 | 80 | 70 | 60 | 50 | 90 | 80 | 70 | 60 | 50 |
| PMDA | | 10 | 20 | 30 | 40 | 50 | 10 | 20 | 30 | 40 | 50 |
| 3,3'-DDS | | 100 | 100 | 100 | 100 | 100 | | | | | |
| 4,4'-DDS | | | | | | | 100 | 100 | 100 | 100 | 100 |
| Properties |||||||||||
| Molecular Weight (Da) | | 52,872 | 64,988 | 51,290 | 32,376 | 22,091 | 43,563 | 36,343 | 38.419 | 33,180 | 18,755 |
| Tg (° C.) | | 218 | 223 | 231 | 237 | 250 | 254 | 262 | 273 | 281 | 290 |
| TGA | Air | 543 | 542 | 528 | 535 | 546 | 533 | 529 | 521 | 519 | 518 |
| (Onset T, ° C.) | $N_2$ | 544 | 541 | 556 | 536 | 536 | 540 | 533 | 530 | 532 | 522 |
| Film Quality[1] | | HC | MC | HC | MC | HC | VC | MC | HC | HC | HC |

The polymer of example 37 made using the solvent casting route was compared with a polymer having the same composition made using a controlled reactive extrusion (Haake) route. The polyamic acid solutions in NMP were concentrated and devolatized with the Haake extruder. The temperature was kept between 370 to 400° C. for 10 minutes and at 50 rpm. The polyimide E37 was also compared with PEI, PEI-S1, and PEI-S2, and the results are shown in Table 7.

TABLE 7

| | | Materials ||||
|---|---|---|---|---|---|
| | | E37 | PEI | PEI-S1 | PEI-S2 |
| Prepared by: | | Solvent Casting | Reactive Extrusion (Haake) | Condensation Polymerization | Displacement Polymerization | Condensation Polymerization |
| Tg (° C.) | | 265 | 265 | 217 | 267 | 247 |
| TGA | Air | 543 | 540 | 511.24 | 485.67 | 513.29 |
| (Onset Temp, ° C.) | $N_2$ | 543 | 546 | 516.47 | 485.08 | 504.82 |
| Film Quality[1] | | HC | HC | HC | MC | HC |

TABLE 7-continued

| | Materials | | | |
|---|---|---|---|---|
| | E37 | PEI | PEI-S1 | PEI-S2 |
| CTE (μm/(m · ° C.) | 21.98  22.08 | | 48.09 | 47.15 | 50.94 |
| Water absorption (23° C., sat) (%) | 1.75  1.69 | | 1.23 | 2.3 | 1.75 |
| oDCB Solubility (150° C.)[2] | INS  INS | | SOL | SOL | SOL |

[1]HC = Highly creasable;
[2]SOL = Soluble; INS = Insoluble

The polyimide obtained from Haake extrusion and from the solvent casting method (example 37) were found to be comparable.

The copolyimides, articles, and methods disclosed herein are further illustrated by the following embodiments, which are non-limiting.

Embodiment 1: A copolyimide, comprising the reaction product of an aromatic dianhydride component comprising, based on the total moles of the aromatic dianhydride component, 10 to 90 mole percent of a substituted or unsubstituted pyromellitic dianhydride or a functional derivative thereof; and 10 to 90 mole percent of an aromatic bis(ether phthalic anhydride) or a functional derivative thereof, of the formula

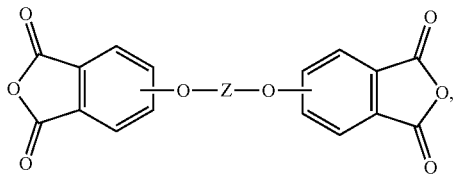

wherein Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, and the divalent bonds of the —O—Z—O— group are in the 3,3', 3,4', 4,3', or the 4,4' positions, preferably in the 4,4' position; and an organic diamine component comprising, based on the total moles of the organic diamine component, 10 to 90 mole percent of a substituted or unsubstituted phenylene diamine; and 10 to 90 mole percent of a diaminodiphenyl sulfone; and wherein the copolyimide exhibits at least one, preferably at least two, more preferably each of the following properties: a glass transition temperature greater than or equal to 210° C., preferably 213 to 365° C., or 220 to 290° C., or 255 to 280° C. as determined by differential scanning calorimetry; an onset decomposition temperature of greater than or equal to 500° C., as determined by thermogravimetric analysis under nitrogen or air; has a water uptake of less than or equal to 3.2%, preferably less than 2.85%, more preferably less than 1.1%, determined by comparing the difference in the weight of a polyimide film that has been immersed in water for 24 hours with the dry weight of the same polyimide film prior to immersion in water; a coefficient of thermal expansion of 20 to 55 ppm/° C., or 30 to 55 ppm/° C., or 40 to 55 ppm/° C., as determined according to ASTM E 831; and a transmission of at least 85%, preferably at least 90% at one or more of 850 nm, 1310 nm, or 1550 nm as measured on an ultraviolet-visible/near infrared spectrophotometer using a 20 to 100 micrometer-thick film of the copolyimide.

Embodiment 2: The copolyimide of embodiment 1, further having at least one, at least two, or all of the following properties: a weight average molecular weight of at least 15,000 Daltons, preferably 20,000 to 100,000 Daltons, more preferably 20,000 to 60,000 Daltons; a residual solvent content of less than 1000 parts per million, preferably less than 500 parts per million by weight of the copolyimide; a shift in melt viscosity of less than 30% over 30 minutes at 380° C. under a nitrogen atmosphere as measured in a small amplitude oscillatory time sweep rheology at a fixed angular frequency of 10 radians/second; and a char yield of greater than 30 weight percent, as determined using thermogravimetric analysis under inert atmosphere of nitrogen.

Embodiment 3: The copolyimide of embodiments 1 or 2, wherein the organic diamine component comprises meta-phenylene diamine, and 3,3'-diaminodiphenyl sulfone, 4,4'-diaminodiphenyl sulfone, or a combination comprising at least one of the foregoing, preferably wherein the organic diamine component comprises meta-phenylene diamine and 3,3'-diaminodiphenyl sulfone.

Embodiment 4: The copolyimide of any one or more of embodiments 1 to 3, wherein the aromatic dianhydride component comprises pyromellitic dianhydride, and an aromatic bis(ether phthalic anhydride) comprising 4,4'-bisphenol A dianhydride, 3,3'-bisphenol A dianhydride, or a combination comprising at least one of the foregoing.

Embodiment 5: The copolyimide of any one or more of embodiments 1 to 4, wherein the aromatic dianhydride component comprises 10 to 85 mole percent pyromellitic dianhydride and 15 to 90 mole percent of the aromatic bis(ether phthalic anhydride); and the organic amine component comprises 10 to 90 mole percent diaminodiphenyl sulfone and 10 to 90 mole percent meta-phenylene diamine; and the copolyimide has a glass transition temperature of greater than or equal to 220° C., preferably 220 to 305° C.

Embodiment 6: The copolyimide of any one or more of embodiments 1 to 4 wherein the aromatic dianhydride component comprises 25 to 75 mole percent pyromellitic dianhydride and 25 to 75 mole percent of the aromatic bis(ether phthalic anhydride); and the organic amine component comprises, 10 to 90 mole percent diaminodiphenyl sulfone and 10 to 90 mole percent meta-phenylene diamine; and the copolyimide has a glass transition temperature of greater than or equal to 233° C., preferably 233 to 290° C.

Embodiment 7: The copolyimide of any one or more of embodiments 1 to 4, wherein the aromatic dianhydride component comprises 50 to 70 mole percent pyromellitic dianhydride; and 30 to 50 mole percent of the aromatic bis(ether phthalic anhydride); and the organic amine component comprises 10 to 90 mole percent diaminodiphenyl sulfone and 10 to 90 mole percent meta-phenylene diamine; and the copolyimide has a glass transition temperature of greater than or equal to 250° C., preferably 250 to 275° C.

Embodiment 8: A method of manufacturing a polyimide film, the method comprising, casting a solution comprising a copolyamic acid corresponding to the copolyimide of any one or more of embodiments 1 to 7 and a liquid carrier on a substrate to provide a copolyamic acid film; and curing the polyamic acid film to provide the polyimide film.

Embodiment 9: A method of manufacturing a polyimide film, the method comprising extruding a solution comprising a copolyamic acid solution corresponding to the copolyimide of any one or more of embodiments 1 to 7 and a liquid carrier to provide a polyimide film.

Embodiment 10: The method of embodiment 8 or 9, wherein the copolyamic acid is prepared by a method comprising contacting an aromatic dianhydride component comprising, based on the total moles of the aromatic dianhydride component, 10 to 90 mole percent of a substituted or unsubstituted pyromellitic dianhydride or a functional derivative thereof; and 10 to 90 mole percent of an aromatic bis(ether phthalic anhydride) or a functional derivative thereof, of the formula

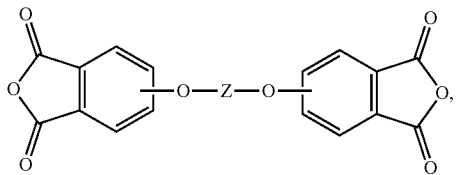

wherein Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, and the divalent bonds of the —O—Z—O— group are in the 3,3', 3,4', 4,3', or the 4,4' positions, preferably in the 4,4' position; and an organic diamine component comprising, based on the total moles of the organic diamine component, 10 to 90 mole percent of a substituted or unsubstituted phenylene diamine; and 10 to 90 mole percent of a diaminodiphenyl sulfone.

Embodiment 11: The method of any one or more of embodiments 8 to 10, wherein the liquid carrier is ortho-dichlorobenzene, dimethyl formamide, dimethyl acetamide, N-methylpyrrolidone, sulfolane, diphenyl sulfone, dimethyl sulfone, m-cresol, diphenyl ether, hexamethyl phosphoramide, dimethyl imidazole, dimethyl sulfoxide, tetramethylurea, N-ethylpyrrolidone, veratrole, anisole, tetrahydrofuran, 1,4-dioxane, dimethyl carbonate, N-methylcaprolactam, an aliphatic alcohol, water, or a combination comprising at least one of the foregoing.

Embodiment 12: The method of any one or more of embodiments 8 to 11, wherein the curing comprises thermal curing or vacuum imidization, or chemical imidization, wherein chemical imidization is conducted in the presence of a chemical imidization agent.

Embodiment 13: The method of any one or more of embodiments 1-12, wherein the contacting is in the presence of an end capping agent, preferably 1.5 to 5 mole percent of an end capping agent, based on the total moles of the dianhydride; the end capping agent comprises a monofunctional amine, a monofunctional anhydride, or a combination comprising at least one of the foregoing; and the end capping agent is added at the beginning, during, or at the end of polymerization, more preferably the end capping agent is added at the beginning or during polymerization.

Embodiment 14: A polymer composition comprising, 1 to 99 weight percent, preferably 10 to 90 weight percent, of a thermoplastic polymer, preferably a polyarylene ether ketone, a polybenzimidazole, a polyarylene sulfone, a polyarylene sulfide, a polyarylene ether, a polyimide, a polyamide imide, a polyetherimide (including copolymers such as polyetherimide-siloxane copolymers), a liquid crystalline polymer, or a combination comprising at least one of the foregoing; and 1 to 99 weight percent, preferably 10 to 90 weight percent, of the copolyimide of any one or more embodiments 1 to 7, wherein weight percent of each component is based on the total weight of the composition.

Embodiment 15: The polymer composition of embodiment 14, wherein the polyarylether ketone is a poly(ether ether ketone), a poly(ether ketone), a poly(ether ketone ketone), a poly(ketone ether ketone ketone), or a combination comprising at least one of the foregoing.

Embodiment 16: The polymer composition of any one or more of embodiments 14 to 15, further comprising a particulate filler, reinforcing agent, lubricant, colorant, stabilizer, mold release agent, ultraviolet light absorber, or a combination comprising at least one of the foregoing.

Embodiment 17: An article comprising the copolyimide of any one or more of embodiments 1 to 7, or a copolyimide made by the method of any one or more of embodiments 8 to 13, or the composition of any one or more of embodiments 14 to 16.

Embodiment 18: The article of embodiment 17, wherein the article is a molded article, a layer, a film, an extruded article, a coating, a pellet, a powder, a foam, a tubing, a fiber, or a flake.

Embodiment 19: The article of embodiment 17 or 18, wherein the article is an optical lens, sight glass, optical fiber connector, electrical connector, light-emitting diode reflector, printed circuit board substrate, reflector for automotive headlamp, component of a fuel system for a gasoline engine, a diesel engine, an aircraft jet engine, or an aircraft turboprop engine, a fuel bowl, an adhesive, or a fuel filter housing.

Embodiment 20: A method of forming the article of any one or more of embodiments 17 to 19, comprising shaping, extruding, or molding, the copolyimide of any one or more of embodiments 1 to 7, or a copolyimide made by the method of any one or more of embodiments 8 to 13, or the composition of any one or more of embodiments 14 to 16.

In general, the compositions, methods, and articles can alternatively comprise, consist of, or consist essentially of, any appropriate components herein disclosed. The compositions, methods, and articles can additionally, or alternatively, be formulated so as to be devoid, or substantially free, of any steps, components, materials, ingredients, adjuvants or species used in the prior art compositions or that are otherwise not necessary to the achievement of the function and/or objectives of the claims. All ranges disclosed herein are inclusive of the endpoints, and the endpoints are independently combinable with each other. "Combination" is inclusive of blends, mixtures, alloys, reaction products, and the like. "Or" means "and/or." The terms "a" and "an" and "the" herein do not denote a limitation of quantity, and are to be construed to cover both the singular and the plural, unless otherwise indicated herein or clearly contradicted by context. Reference throughout the specification to "one embodiment," "another embodiment," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—$(CH_2)_3$—)). "Alkenyl" and "alkenylene" mean a monovalent or divalent, respectively, straight or branched chain hydrocarbon group having at least one carbon-carbon double bond (e.g., ethenyl (—HC=$CH_2$) or propenylene (—HC($CH_3$)=$CH_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$ and —$C_nH_{2n-2x}$— wherein x is the number of cyclizations. "Aryl" means a monovalent, monocyclic, or polycyclic aromatic group (e.g., phenyl or naphthyl). "Arylene" means a divalent, monocyclic or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g, benzyl), $C_{7-12}$ alkylarylene (e.g, toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituents.

All cited patents, patent applications, and other references are incorporated herein by reference in their entirety.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A copolyimide, comprising the reaction product of
an aromatic dianhydride component comprising, based on the total moles of the aromatic dianhydride component,
greater than 50 to 90 mole percent of a substituted or unsubstituted pyromellitic dianhydride or a functional derivative thereof; and
10 to less than 50 mole percent of an aromatic bis(ether phthalic anhydride) or a functional derivative thereof, of the formula

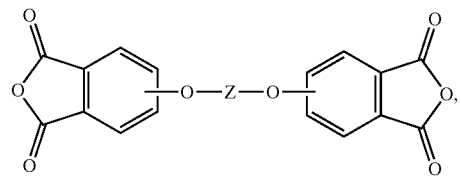

wherein
Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, and
the divalent bonds of the —O—Z—O— group are in the 3,3', 3,4', 4,3', or the 4,4' positions; and
an organic diamine component comprising, based on the total moles of the organic diamine component,
10 to 90 mole percent of a substituted or unsubstituted phenylene diamine; and
10 to 90 mole percent of a diaminodiphenyl sulfone; and
wherein the copolyimide exhibits at least one of the following properties:
a glass transition temperature greater than or equal to 210° C. as determined by differential scanning calorimetry;
an onset decomposition temperature of greater than or equal to 500° C., as determined by thermogravimetric analysis under nitrogen or air;
has a water uptake of less than or equal to 3.2% determined by comparing the difference in the weight of a polyimide film that has been immersed in water for 24 hours with the dry weight of the same polyimide film prior to immersion in water;
a coefficient of thermal expansion of 20 to 55 ppm/° C., as determined according to ASTM E 831; and
a transmission of at least 85% at one or more of 850 nm, 1310 nm, or 1550 nm as measured on an ultraviolet-visible/near infrared spectrophotometer using a 20 to 100 micrometer-thick film of the copolyimide.

2. The copolyimide of claim 1, further having at least one of the following properties:
a weight average molecular weight of at least 15,000 Daltons;
a residual solvent content of less than 1000 parts per million by weight of the copolyimide;
a shift in melt viscosity of less than 30% over 30 minutes at 380° C. under a nitrogen atmosphere as measured in a small amplitude oscillatory time sweep rheology at a fixed angular frequency of 10 radians/second; and
a char yield of greater than 30 weight percent, as determined using thermogravimetric analysis under inert atmosphere of nitrogen.

3. The copolyimide of claim 1, wherein the organic diamine component comprises meta-phenylene diamine and 3,3'-diaminodiphenyl sulfone.

4. The copolyimide of claim 1, wherein the aromatic dianhydride component comprises pyromellitic dianhydride, 4,4'-bisphenol A dianhydride, 3,3'-bisphenol A dianhydride, or a combination comprising at least one of the foregoing.

5. The copolyimide of claim 1, wherein
the aromatic dianhydride component comprises
greater than 50 to 70 mole percent pyromellitic dianhydride; and 30 to less than 50 mole percent of the aromatic bis(ether phthalic anhydride); and
the organic amine component comprises
10 to 90 mole percent 3,3'-diaminodiphenyl sulfone and
10 to 90 mole percent meta-phenylene diamine; and
the copolyimide has a glass transition temperature of greater than or equal to 250° C.

6. A method of manufacturing a polyimide film, the method comprising,
casting a solution comprising a copolyamic acid corresponding to the copolyimide of claim 1 and a liquid carrier on a substrate to provide a copolyamic acid film; and
curing the polyamic acid film to provide the polyimide film.

7. A method of manufacturing a polyimide film, the method comprising,
extruding a solution comprising a copolyamic acid solution corresponding to the copolyimide of claim 1 and a liquid carrier to provide a polyimide film.

8. The method of claim 6, wherein the copolyamic acid is prepared by a method comprising contacting
an aromatic dianhydride component comprising, based on the total moles of the aromatic dianhydride component,
10 to 90 mole percent of a substituted or unsubstituted pyromellitic dianhydride or a functional derivative thereof; and
10 to 90 mole percent of an aromatic bis(ether phthalic anhydride) or a functional derivative thereof, of the formula

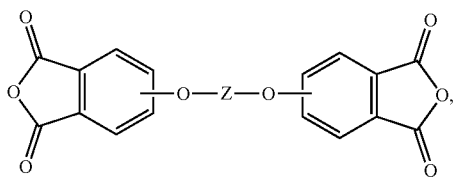

wherein
Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, and
the divalent bonds of the —O—Z—O— group are in the 3,3', 3,4', 4,3', or the 4,4' positions; and
an organic diamine component comprising, based on the total moles of the organic diamine component,
10 to 90 mole percent of a substituted or unsubstituted phenylene diamine; and
10 to 90 mole percent of a diaminodiphenyl sulfone.

9. The method of claim 6, wherein the liquid carrier is ortho-dichlorobenzene, dimethyl formamide, dimethyl acetamide, N-methylpyrrolidone, sulfolane, diphenyl sulfone, dimethyl sulfone, m-cresol, diphenyl ether, hexamethyl phosphoramide, dimethyl imidazole, dimethyl sulfoxide, tetramethylurea, N-methylpyrrolidone, veratrole, anisole, tetrahydrofuran, 1,4-dioxane, dimethyl carbonate, N-methyl-caprolactam, an aliphatic alcohol, water, or a combination comprising at least one of the foregoing.

10. The method of claim 6, wherein the curing comprises thermal curing or vacuum imidization, or chemical imidization, wherein chemical imidization is conducted in the presence of a chemical imidization agent.

11. The method of claim 8, wherein
the contacting is in the presence of an end capping agent;
the end capping agent comprises a monofunctional amine, a monofunctional anhydride, or a combination comprising at least one of the foregoing; and
the end capping agent is added at the beginning, during, or at the end of polymerization.

12. A polymer composition comprising,
1 to 99 weight percent of a thermoplastic polymer; and
1 to 99 weight percent of the copolyimide of claim 1,
wherein weight percent of each component is based on the total weight of the composition.

13. The polymer composition of claim 12, wherein the thermoplastic polymer is a poly(ether ether ketone), a poly(ether ketone), a poly(ether ketone ketone), a poly(ketone ether ketone ketone), or a combination comprising at least one of the foregoing.

14. The polymer composition of claim 12, further comprising an additive, wherein the additive is a particulate filler, reinforcing agent, lubricant, colorant, stabilizer, mold release agent, ultraviolet light absorber, or a combination comprising at least one of the foregoing.

15. An article comprising the copolyimide of claim 1.

16. The article of claim 15, wherein the article is an optical lens, sight glass, optical fiber connector, electrical connector, light-emitting diode reflector, printed circuit board substrate, reflector for automotive headlamp, component of a fuel system for a gasoline engine, a diesel engine, an aircraft jet engine, or an aircraft turboprop engine, a fuel bowl, an adhesive, or a fuel filter housing.

17. A method of forming the article of claim 15, comprising shaping, extruding, or molding, the copolyimide of claim 1.

18. The copolyimide of claim 1, wherein the copolyimide exhibits all of the following properties:
a glass transition temperature greater than or equal to 210° C. as determined by differential scanning calorimetry;
an onset decomposition temperature of greater than or equal to 500° C., as determined by thermogravimetric analysis under nitrogen or air;
has a water uptake of less than or equal to 3.2% determined by comparing the difference in the weight of a polyimide film that has been immersed in water for 24 hours with the dry weight of the same polyimide film prior to immersion in water;
a coefficient of thermal expansion of 20 to 55 ppm/° C., as determined according to ASTM E 831; and
a transmission of at least 85% at one or more of 850 nm, 1310 nm, or 1550 nm as measured on an ultraviolet-visible/near infrared spectrophotometer using a 20 to 100 micrometer-thick film of the copolyimide.

* * * * *